United States Patent [19]

Freedman et al.

[11] 3,984,302
[45] Oct. 5, 1976

[54] APPARATUS FOR CONTROLLING MARINE FOULING OF SALT WATER COOLANT HEAT EXCHANGERS, PIPING SYSTEMS, AND THE LIKE

[75] Inventors: Bernard J. Freedman, Groton; Bernard S. Ryskiewich, Pawcatuck, both of Conn.

[73] Assignee: General Dynamics Corporation, Groton, Conn.

[22] Filed: Nov. 18, 1974

[21] Appl. No.: 524,724

[52] U.S. Cl. ................ 204/196; 204/147; 204/149; 204/228; 204/275
[51] Int. Cl.² ................................. C23F 13/00
[58] Field of Search ........... 204/147, 149, 196, 228, 204/275

[56] References Cited
UNITED STATES PATENTS

| | | |
|---|---|---|
| 3,241,512 | 3/1966 | Green .......................... 204/196 X |
| 3,458,414 | 7/1969 | Crane et al. .................... 204/149 |
| 3,520,790 | 7/1970 | Araki et al. .................... 204/147 X |
| 3,523,891 | 8/1970 | Mehl ............................. 204/149 X |
| 3,530,051 | 9/1970 | Ueda et al. ..................... 204/147 |

*Primary Examiner*—Howard S. Williams
*Assistant Examiner*—A. C. Prescott

[57] ABSTRACT

Marine fouling of the tubes of heat exchangers, piping conduits, and like apparatus through which sea water flows is controlled with the aid of an assembly mounted in situ within the system at the inlet ends of the tubes which generates chlorine gas by electrolytic action. The chlorine gas is distributed by the flowing sea water through the tubes and prevents the accumulation of marine plant and animal material on the internal surface of the tubes, thus controlling marine fouling.

5 Claims, 6 Drawing Figures

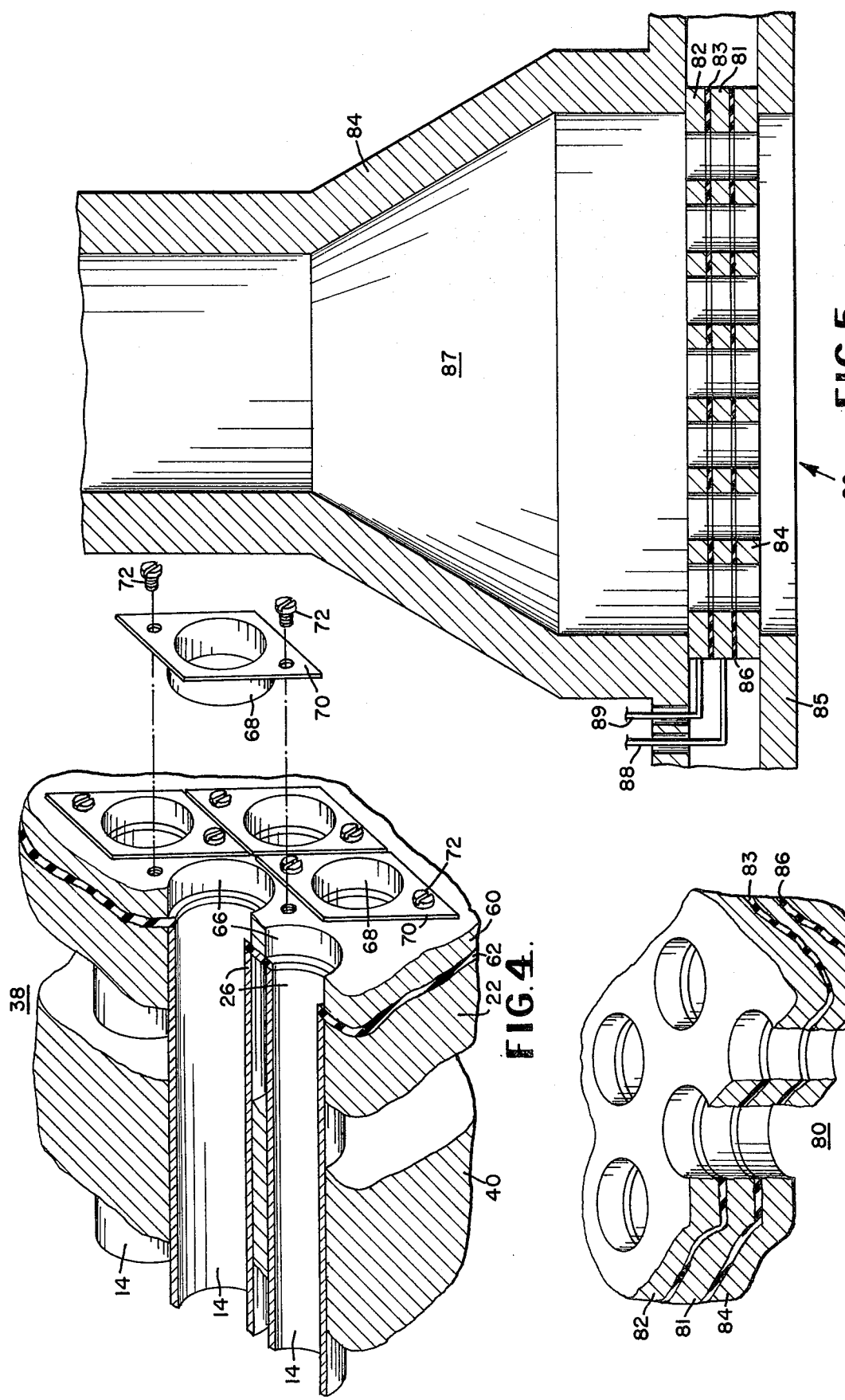

APPARATUS FOR CONTROLLING MARINE FOULING OF SALT WATER COOLANT HEAT EXCHANGERS, PIPING SYSTEMS, AND THE LIKE

The present invention relates to methods and apparatus for the control of marine fouling in systems using sea water and particularly to methods and apparatus for controlling marine fouling of tubular heat exchangers which use sea water coolants, and piping systems which transport sea water.

The invention is especially suitable for use in submarine and surface ship salt water coolant heat exchangers such as may be used as condensers aboard nuclear powered vessels. The invention may also be advantageously utilized in other sea water cooling systems, such, for example as sea water coolant heat exchangers which provide condensers associated with steam turbines in shoreline or offshore power plants. The invention may further be advantageously used in any on-board or shoreline salt water system used for other than heat exchange, such as fire fighting and personnel showers.

A serious problem in ships and shore based power plants using sea water cooled systems is the fouling of tubing which receives sea water and through which the sea water flows for heat exchange purposes. The fouling results from plant and animal life which are present in the sea water and may be further complicated by salt formation on the internal walls of the tubing. It is important to distinguish three types of fouling: 1. the "slime" type consisting of microscopic organic and inorganic particulates, microbes and phytoplankton, 2. the "animal-plant" type consisting of microscopic animals and plants, and 3. the type caused by salts in the media depositing and caking on internal tube walls. The "slime" type of fouling, occurring as films on heat exchanger/condenser tubing, may reduce heat exchange efficiency but does not produce gross changes in flow. "Animal-plant" fouling and salt formation will result in flow reduction, loss in heat exchange efficiency and corrosion acceleration in certain instances. Fouling is most pronounced during ship operations in warm waters as in the tropics, and at shallow depths, although fouling occurs everywhere in the oceans at all depths. In may cases heat exchanger tubing becomes blocked and can only be rectified by extensive and costly cleaning operations. Heretofore the principal solution for marine fouling has been overhaul and maintenance procedures during which a heat exchanger is disassembled and the tubes are physically cleaned, as by ramming cleaning rods through the tubes.

Copper base alloys used in sea water coolant heat exchangers and condenser tubing are effective animal antifouling agents because of the toxicity property of copper. Their effectiveness, however, is dependent on the absence of passivation—a condition that cannot be relied on. It is also recognized that continuous water velocities of 3 feet per second or greater in the tubes will prevent attachment. Once organisms are attached, however, much higher velocities are required for detachment. Since materials of construction and water flow rates alone cannot be relied on to keep heat exchanger tubing clear, additional measures are required. The same arguments apply to piping conduit systems.

Another problem experienced by ships is the fouling of sea water piping systems used for fire fighting purposes. This type of system is often exposed to stagnant sea water conditions which are conducive to the growth of marine life particulants, principally mussels. Continuous growth eventually plugs the piping, restricting the flow of sea water when needed in emergencies. This can jeopardize or imperil the safety of the crew as well as the integrity of the ship. It has been suggested that ship sea water coolant heat exchangers be treated by chlorination in order to control fouling caused by marine animal and plant life. The circulating and service water systems of most power generating facilities have long used chlorination to control fouling. Typically, sodium hypochlorite and chlorine gas have been used intermittently by injection in the heat exchanger cooling water (see Power Magazine July 1974, pages 46 and 47, Article entitled "On-Site Hypochlorite Production Eliminates Problems in Heat Exchange of Chlorine Supply," by Eric Haemer). Other suggestions for generating chlorine gas externally of the heat exchanger by electrolysis have also been made (see U.S. Pat. Nos. 3,458,413 and 3,530,051). It is well known that insoluble electrodes of platinum alloys, magnetic iron oxides and platinum plating on titanium, etc. when used as anodes, in the electrolysis of sea water, will evolve chlorine. Notwithstanding that chlorine gas and the products of its reaction with water will greatly reduce marine fouling, the known means and techniques for chlorine dosing to prevent marine fouling have not found practical application aboard ship. Chlorine gas is hazardous to generate or store and to use under any circumstances. In confined environments, as aboard submarines, liquid or gaseous chlorine is particularly dangerous. It is hazardous to the health of the crew and corrosive to materials. Even if stored in anhydrous form, chlorine has a tendency to expand such that elevation in ambient temperature is likely to cause a container tank to rupture. In addition, chlorine is a vigorous oxidizing agent and can cause instant oxidation and breakdown of metal conventionally used in submarine construction, particularly when ignited by a spark. Moreover, chlorine in its various forms, such as sodium hypochlorite, is difficult to store and losses its effectivity upon storage for reasonable periods of time, say a few months.

Off-site hypochlorite generation requires extensive equipment and space, the latter often being at a premium aboard ships, particularly submarines. Additionally, this method requires separate sources of sea water supply and a penetration must be made into the heat exchanger system or into a sea water piping system, an undesirable situation for submarines (vis. the so-called "sub-safe" region). Also, diffusion into a heat exchanger will not guarantee adequate hypochlorite distribution to the heat exchanger tubing. Off-site generators require maintenance and monitoring. Where a ship has need for more than one salt water coolant heat exchanger, as is most often the case, a separate hypochlorite generator would be required to service each unit. The alternative is to use one large generator to service all heat exchangers. This would add to the problems addressed to above: additional equipment and space and obviously long lengths of piping. The latter is particularly objectionable in submarines and smaller surface ships. Similar arguments can be made for onshore power generating facilities using sea water coolant heat exchangers and also for control of fouling of piping systems for fire fighting aboard ships.

Briefly described the invention controls fouling by chlorination produced by electrolyzing the sea water in situ within the heat exchanger itself and particularly at the inlet end of each of the tubes. Chlorine gas is then released at the inlet end of the tubes and is carried by the sea water through the tubes as the sea water flows therethrough. Along the way the chlorine will combine with the water to form hypochlorite ions or hypochlorous acid. The interior peripheral surfaces of the tubes are then exposed to the chlorine products and protected against fouling by marine life which is present in the sea water.

It has been found that the level of chlorination required runs from approximately 0.25 parts per million (ppm) to 2.5 ppm in order to kill marine fouling organisms. However, the lower value has been found to be ample to destroy most of the organisms and intermittent treatments at this concentration can be effective for control of slimes and hydroids and most larvae of the common fouling organisms. By sea water is meant the water contained in the ocean, brackish water and other saline liquids containing organic materials.

It is therefore an object of the present invention to provide an improved apparatus for controlling marine fouling of piping systems using sea water by generation of chlorine and its products at the entrance of the piping by electrolysis.

The foregoing and other objects, advantages and features of the invention will become more apparent from a reading of the following description in connection with the accompanying drawings in which FIG. 1 is a plan view, partially in section of a heat exchanger embodying the invention;

FIG. 4 is a view similar to FIG. 3 which illustrates electrolyzing apparatus in accordance with still another embodiment of the invention; and FIG. 5 is a cross sectional view of another embodiment for controlling fouling of piping conduits at the sea water inlet.

FIG. 6 is an isometric view of a portion of the embodiment of FIG. 5.

Figure 1:
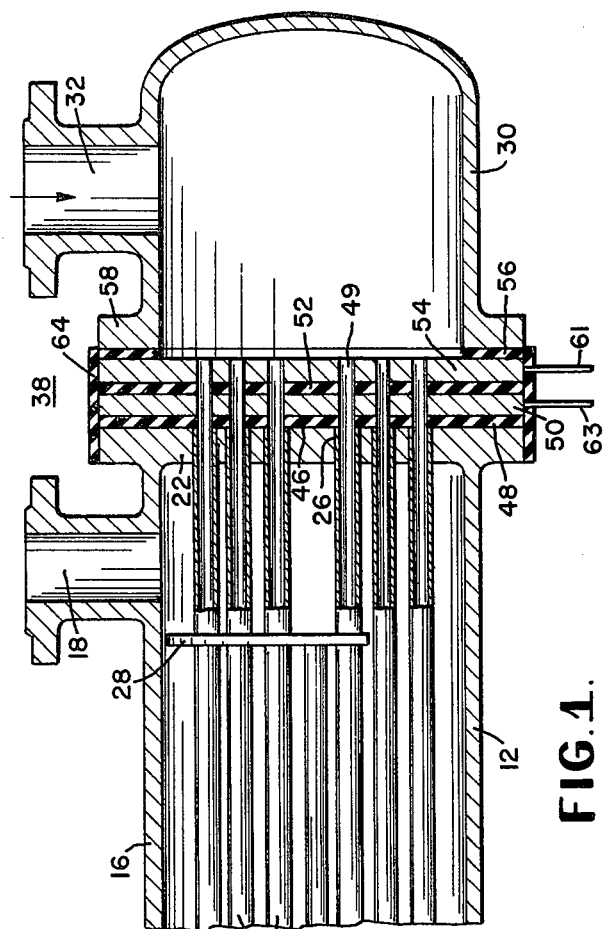

Referring more particularly to FIG. 1, there is shown a heat exchanger 10 having a shell 12. Numerous tubes 14 are disposed within a central section 16 of the shell 12. These tubes may be made of a copper nickel alloy material of the type conventionally used in heat exchangers which serve the purpose of condensers for steam which is circulated through ports 18 and 20 in the central section 16 of the shell 12. The tubes 14 are mounted in transverse plates which are known as tube sheets 22 and 24. Only the outer tube sheets, particularly the tube sheet 22 in which the inlet ends 26 of the tubes 14 are located are shown in detail in FIG. 1 in order to simplify the illustration.

Several inner tube sheets may be used for supporting tubes 14 along their axial lengths. In addition, a baffle 28, shown within the central section 16 of the shell 12, controls the flow of the steam or other gas fluid for more uniform circulation around the tubes 14.

Sea water flows due to a pressure head, which is suitably provided by an external pump, into the head end 30 of the shell 12 through an inlet port 32. The sea water then flows through the tubes 14 and into the tail section 34 of the shell where it is drained through an outlet port 36. Assembled with the outer tube sheet 22, as a unitary assembly, is an apparatus 38 for electrolyzing the sea water so as to release sufficient chlorine gas. This gas is carried by the water into the inlet end 26 of the tubes 14 and serves to protect the interior peripheral surfaces of the tube against marine fouling as by plant and animal marine life present in the sea water. The chlorine gas along with the hydrogen and sodium hydroxide produced by electrolysis dissolve or are entrained in the sea water and are discharged. The concentrations of these products are very small (approximately 1 PPM residual chlorine), thus leaving the environmental condition of the sea water virtually unchanged.

The chlorine gas may be produced electrolytically either on a continuous or intermittent basis. No chemicals or other additives are required and no penetrations are required to introduce or distribute chlorine to the heat exchanger tubing. These advantages arise principally because of the methods and apparatus provided by the invention for generating the chlorine gas in situ in the heat exchanger apparatus itself.

In order for this system to be an automatic system, a transducer capable of measuring residual chlorine must be incorporated. A chlorometer is employed as a measuring instrument with a transducer installed in the heat exchanger discharge area 36. The chlorometer output is fed to a transistorized controller which controls the output of the power supply. An automatic temperature compensating control is also incorporated in the chlorometer. The controller adjusts the output of the power supply automatically, based on the present residual required from the chlorometer. When the residual is not obtained the power supply is turned full on. As a residual is detected by the chlorometer the power output is automatically cut back to the necessary level. Thus the system is self compensating for changes in flow rate, temperature and salinity.

Figure 2:
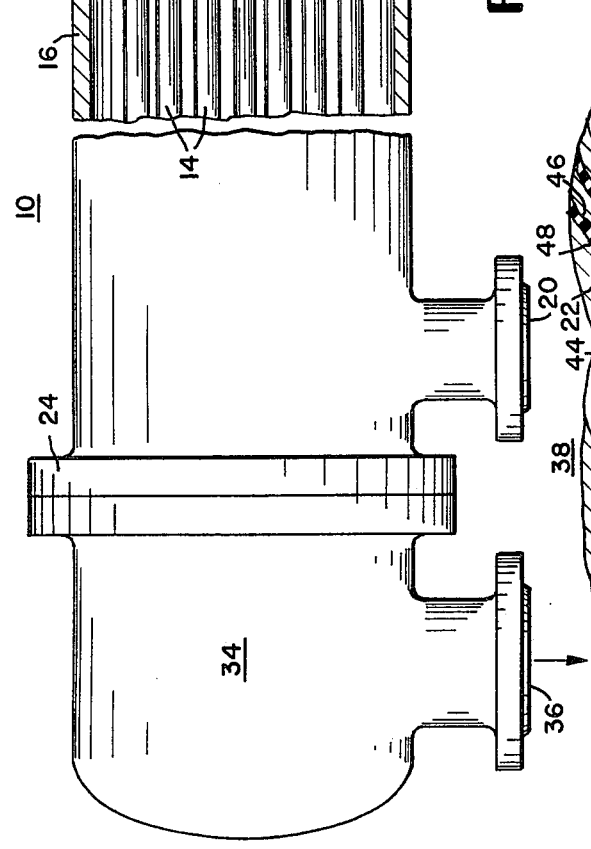
FIG. 2 is a fragmentary perspective view of a portion of the heat exchanger shown in FIG. 1 which illustrates apparatus for electrolyzing the sea water coolant in accordance with an embodiment of the invention.

The sea water electrolyzing apparatus shown in FIG. 1 is also illustrated in greater detail in FIG. 2. The heat exchanger tubes 14, which may also be supported by an inner tube sheet 40 have their inlet ends 26 within receiving apertures 42 in the tube sheet 22. The inlet end 26 extends from the inner side 44 of the tube sheet 22 to the opposite or outer side 46 thereof. In other words, the inlet end 26 of the tubes 14 are substantially flush with the outer side 46 of the tube sheet 22.

An apertured sheet 48 of the insulating material is disposed on the outer side 46 of the tube sheet and has its apertures aligned with the tube sheet apertures. A first plate or sheet 50 of conductive material, another sheet 52 of insulating material, and another plate or sheet 54 of conductive material are then assembled, with the insulating sheet 48, on the outer side 46 of the tube sheet 22. These sheets 50, 52 and 54 are all apertured with their apertures located in the same spaced relationship as the apertures in the tube sheet 22 so that all of the apertures will be aligned to provide channels for the flow of the sea water into the tubes 14. A ring 56 of insulating material is also provided between a flange 58 in the head section 30 of the shell 12 so as to insulate the sheet 54 from the head section of the shell. Leads 61 and 63 are connected to the sheets 54 and 50. The entire assembly may be held together by suitable insulated bolts which extend between the flange 58 and the sheet 22. Preferably a cylinder 64 of insulating material through which the leads 61 and 63 extend surround the assembly 38.

The conductive sheets 50 and 54 provide the electrodes of an electrolytic cell. When current is passed through this cell, the sea water which is located in the area formed by the apertures in the sheets 50 and 54 and in the insulating sheet 52 acts as an electrolyte. The following reaction takes place:

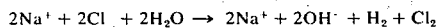
$$2Na^+ + 2Cl^- + 2H_2O \rightarrow 2Na^+ + 2OH^- + H_2 + Cl_2$$

The chlorine is discharged at the anode and, if favorable conditions exist, will react with water to give the hypochlorite ion ($OCl^-$) or hypochlorous acid ($HClO$). Direct current is used. The positive terminal is preferably connected to the lead 61 so that the sheet 54 acts as an anode and the negative terminal is connected to the lead 63 so that the sheet 50 acts as a cathode. Chlorine is then generated in gaseous form at the anode (the apertures in the sheet 54). This chlorine gas and its reaction products are carried along by the flow of the sea water and controls marine fouling within the tubes 14.

In order to retard corrosion, erosion, and dissolution in sea water, both electrodes, or at least the electrode which serves as the anode and at which the chlorine gas is formed is made of titanium metal which is covered, as for example by plating with platinum. However, any insoluble material such as platinum, platinum alloys, magnetic-iron oxide, etc. may be used for the anode. Tubular inserts of titanium which may have their interior peripheral surfaces covered as by being plated with platinum, may also be used, as will be discussed more fully hereinafter in connection with FIG. 4.

Figure 3:
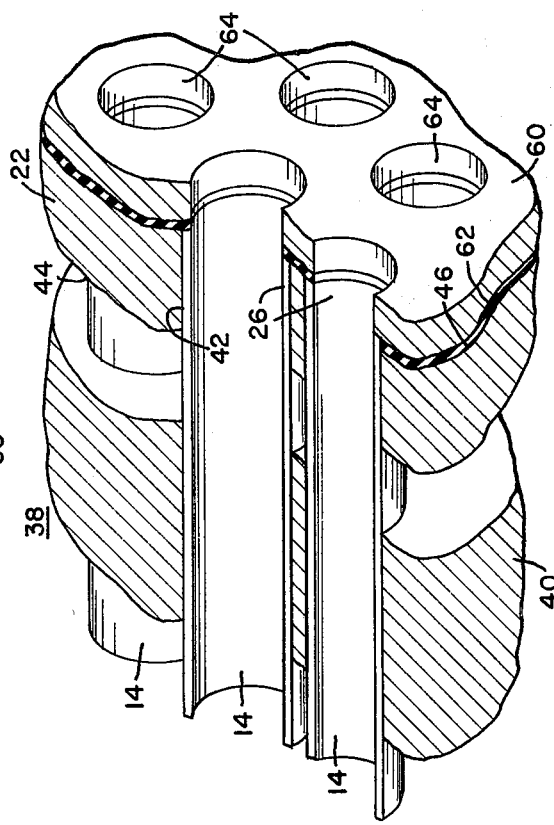
FIG. 3 is a view similar to FIG. 2 which illustrates electrolyzing apparatus in accordance with another embodiment of the invention.

FIG. 3 illustrates another embodiment of the electrolytic cell apparatus 38 and like parts of the apparatus shown in FIGS. 1, 2 and in FIG. 3 are designated with like reference numerals. Instead of a pair of electrodes provided by two conductive sheets which are arranged in insulating relationship, only one sheet 60 is used together with a single sheet 62 of insulating material which is sandwiched between the conductive sheet 60 and the outer surface 46 of the tube sheet 22. The conductive and insulating sheets 60 and 62 are apertured in positions corresponding to the apertures in the tube sheet 22 and define an electrolyte region 64 in the area of the apertures in the conductive sheet 60, the tube sheet 62 as well as in the interior of the inlet ends 26 of the tubes 14. A lead is connected to the sheet 60 which serves as the anode electrode of the cell 38, while the other electrode is provided by the tube sheet and inlet end 26 areas adjacent to the insulating sheet 62. The electrode provided by the plate 60 is preferably used as the anode, and the positive terminal of the direct current source is connected thereto, while the negative terminal of the source is connected to ground (viz., and provides a sea water return path to the potential source). The surfaces of the apertures in the sheet 60 may be plated with platinum. The sheet 60 itself may be titanium.

FIG. 4 illustrates electrolytic cell apparatus 38 which is similar to the apparatus shown in FIG. 3 and like parts are labeled with like reference numerals. The sheet 60 has apertures 66 which are adapted to receive tubular inserts 68. These tubular inserts have flanges 70 which provide for the attachment of the inserts to the sheet 60 by means of screws 72. The inserts 70 are desirably made of titanium. However, they may be made of platinum or have the surfaces of the apertures therein covered, as by being plated with platinum, again for corrosion resistance purposes. The electrolytic cell assembly 38 whether of the type illustrated in FIGS. 1 and 2 or in FIGS. 3 or 4 may readily be disassembled and removed from the tube sheet 22 so as to facilitate the inspection of the tubes 14, as by the probolog technique.

FIG. 5 illustrates another embodiment of the electrolytic cell unit 80 which is employed to control fouling of a sea water piping conduit on a ship. FIG. 6 is an isometric view of the same electrolytic cell unit 80. This unit includes two conductive sheets 81 and 82 which serve as electrodes which are arranged in insulating relationship with a sheet of insulating material 83 sandwiched between them. A strainer 84 which serves to prevent gross particulate matter in the sea water from entering the piping conduit is attached to the ship hull 85. An insulating sheet 86 is positioned between the strainer 84 and conducting sheet 81. The conductive sheets 81 and 82 and the insulating sheets 83 and 86 are apertured in positions corresponding to the apertures in the strainer 84 to provide an unobstructed flow path for the sea water as it enters the pipe inlet 87 and yet be exposed and in contact with the sea water. The electrolytic cell assembly and the strainer may be held together by suitable insulating bolts. Leads 88 and 89 serve to connect the electrodes with the power source. The conductive sheets are made of titanium with the apertures plated with platinum. Conductive sheet 81 is made the anode.

The rate of chlorine production is dependent on several factors, among them the thickness of the insulating sheet and the voltage potential across it, and to a lesser extent the thickness of the conductive sheet functioning as the anode. The insulating sheet may range from 3/32 inch to 7/32 inch (0.25 cm. to 0.55 cm.) in thickness. Generally, a thickness of about 5/32 inch (0.4 cm.) has been found optimum. The thickness of the anode may be as thin as ¼ inch (.63 cm.) but preferably is about ½ inch (1.25 cm.). The power required per tube with an insulation thickness of 5/32 inch (0.4 cm.), an anode thickness of ½ inch (1.25 cm.), and a desired residual chlorine content of about 1 ppm at the discharge or outlet of the tube has been found to be about 1 watt. A voltage in the vicinity of 6 volts will produce the desired result under the aforementioned conditions. The extent of the anode sheet away from the edge of the inlet is not important. It may, for example, have the form of a washer arranged around the inlet. The insulating sheet must extend far enough to prevent, for all practical purposes, a secondary path for current between anode and cathode other than along the axis of an inlet of a tube.

Chlorometers, measuring devices to automatically monitor residual chlorine and control the power input to assume the desired chlorine concentration, are placed at discharge areas. Other transducers may also be installed in other parts of the system and can be monitored at the chlorometer.

From the foregoing description, it will be apparent that there has been provided an improved method of and apparatus for controlling marine fouling in sea water systems such as heat exchangers, piping conduits and the like. While a heat exchanger having straight through tubes is illustrated it will be appreciated that other forms of heat exchangers, say those having U- shaped tubes may also be adapted to utilize the invention. Other variations and modifications within the scope of the invention will undoubtedly become apparent to those skilled in the art.

Accordingly, the foregoing description should be taken merely as illustrative and not in any limiting sense.

We claim:
1. Apparatus for controlling internal fouling of tubes through which sea water flows comprising:
   a. a tube sheet into which a plurality of tubes are mounted, said tube sheet having openings for the inlets of said tubes,
   b. an insulating sheet in contact with said tube sheet and having apertures matching said openings,
   c. a conductive sheet in contact with said insulating sheet and having apertures matching said openings, sea water flowing through said aperture into said openings, and
   d. means for imposing a direct current electric potential between the tube sheet and said conductive sheet.

2. The invention as set forth in claim 1 further comprising tubular inserts disposed in said apertures of said conductive sheet and having an axial length about equal to the axial length of said conductive sheet apertures.

3. The invention as set forth in claim 2 wherein said tube sheet and said tubes are of like conductive material and said inserts are of platinum.

4. The invention as set forth in claim 1 wherein said conductive sheet in at least the regions thereof surrounding each of the apertures therein is of a material selected from the group consisting of titanium and platinum.

5. The invention as set forth in claim 1 further including a second sheet of insulating material having apertures and a second sheet of conductive material having apertures, said second insulating sheet being sandwiched between said first conductive sheet and said second conductive sheet with the apertures of said sheets in alignment, said potential being imposed between said first and second conductive sheets.

* * * * *